United States Patent [19]
Jogan et al.

[11] Patent Number: 5,945,206
[45] Date of Patent: Aug. 31, 1999

[54] INTERIOR MOLDED ARTICLE FOR AUTOMOBILES

[75] Inventors: Kimio Jogan; Masafumi Kurokawa; Takayuki Ito; Tsugunori Sugiura; Junji Koizumi, all of Aichi; Motoshi Matsuura, Gifu, all of Japan

[73] Assignee: Toyoda Gosei Co., Ltd., Aichi-ken, Japan

[21] Appl. No.: 08/925,327

[22] Filed: Sep. 8, 1997

[30] Foreign Application Priority Data

Sep. 9, 1996 [JP] Japan ................................. 8-238102
Mar. 19, 1997 [JP] Japan ................................. 9-066205

[51] Int. Cl.⁶ .............................. B32B 7/02; B32B 27/40
[52] U.S. Cl. ......................... 428/215; 428/217; 428/332; 428/423.3; 428/424.2; 428/424.4; 428/424.7; 428/424.8; 428/425.8; 428/462; 428/463

[58] Field of Search ..................................... 428/217, 332, 428/213, 215, 423.1, 423.3, 424.2, 424.4, 424.7, 424.8, 425.8, 462, 463

[56] References Cited

U.S. PATENT DOCUMENTS 4,241,129  12/1980  Marton et al. .......................... 428/216

Primary Examiner—D. S. Nakarani
Attorney, Agent, or Firm—Pillsbury Madison & Sutro LLP

[57] ABSTRACT

An interior molded article for automobiles is disclosed, comprising a hard core portion and a soft coating portion for covering the hard core portion, wherein the soft coating portion comprises one or more layers and at least one of them comprises a thermoplastic elastomer material.

17 Claims, 1 Drawing Sheet

FIG. IA
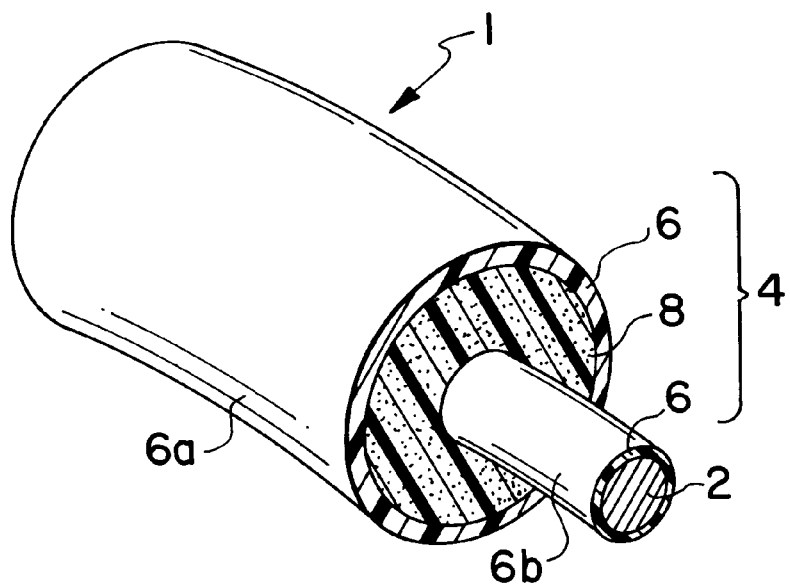
FIG. IB
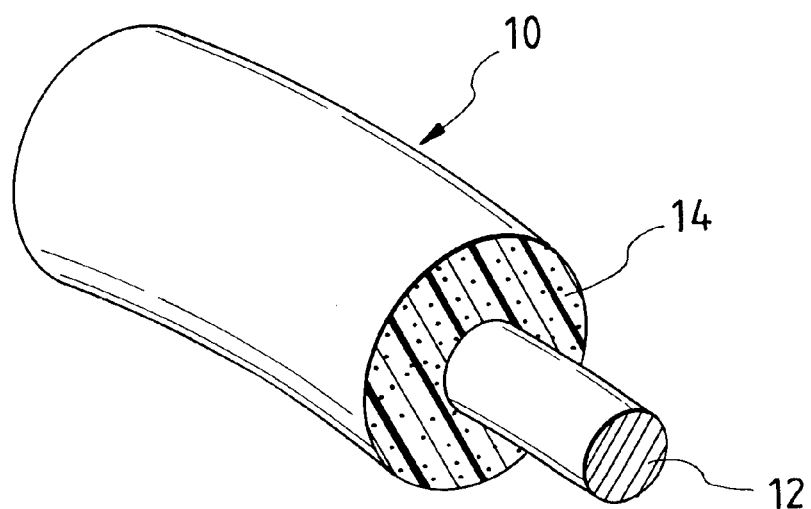

INTERIOR MOLDED ARTICLE FOR AUTOMOBILES

FIELD OF THE INVENTION

The present invention relates to an interior molded article for automobiles comprising a hard core portion and a soft coating portion for covering the hard core portion wherein particularly, the soft coating portion comprises a thermoplastic elastomer.

Particularly, it relates to an interior molded article for automobiles required to not only feel good when touching the steering wheel, arm rest, shift receiver knob, assist grip, etc. (hereinafter referred to as "steering wheel etc."), but also to have abrasion resistance.

[The Explanation of Abbreviations]

TPE: thermoplastic elastomer
TPU: thermoplastic polyurethane elastomer
ASA: acrylate.styrene.acrylonitrile triblock copolymer
TPS: thermoplastic polystyrene elastomer
TPO: thermoplastic polyolefin elastomer
PVC: polyvinyl chloride
PMMA: polymethyl methacrylate
AS: acrylonitrile styrene copolymer
AES: acrylonitrile ethylene styrene copolymer
AAS: acrylate.acrylonitrile.styrene copolymer

BACKGROUND OF THE INVENTION

Recently, in an interior molded article for automobiles such as steering wheel etc., a soft coating portion has been formed with, in view of sense of touch, an integral skin foam of soft polyurethane [RIM (Reaction Injection Molding) urethane material] with which a desirable feel can be obtained and a material comprising, as a base, polyvinyl chloride having a large amount of a plasticizer formulated therein (soft PVC material).

These materials are, however, difficult to recycle, so that a substitute is required to be developed in view of saving resources and environmental problems.

That is, RIM urethane material is heat-curable, so that not only the reuse thereof is difficult, but also both the initial cost and the running cost (material cost) are rather expensive.

Although the soft PVC material is thermoplastic, since it includes a large amount of a plasticizer and, additionally, generates chlorine gas by heating, the reuse thereof is also difficult. It also has a high specific gravity and, therefore, is not suitable as an interior molded article for automobiles.

The present inventors had a great interest in various characteristics of TPU such as its feel and have searched for an interior molded article for automobiles. The TPU, however, has a relatively high hardness, so, by solely using the same, a soft (touch) feeling in gripping the integral skin was difficult to obtained. Thus, in order to obtain the soft feeling, the soft type material (Hs [JIS K-6301 A] of 70° or less) could be considered to be used. But a given abrasion resistance could hardly be obtained therefrom, so that it was almost impossible to apply the same to an interior molded article for automobiles.

Accordingly, it can be considered to form a soft coating portion with a thermoplastic elastomer such as a thermoplastic polyolefin elastomer or a thermoplastic polystyrene elastomer, which are desirable in recycling properties. However, although, for example, a steering wheel etc., molded from an olefinic TPE which is a currently used thermoplastic elastomer (TPE) is light and provides a soft feel, it is lacking of an abrasion resistance and also undesirably provides a sticky feeling so that it substantially could not be applied to an interior molded article for automobiles.

SUMMARY OF THE INVENTION

In view of the above description, in an interior molded article for automobiles formed with TPE material having a soft feeling in gripping without using RIM urethane comparable to that of the integral skin formed by RIM urethane, the object of the present invention is to provide an interior molded article for automobiles having substantially no sticky feeling, having a soft feeling and being excellent in abrasion resistance.

The interior molded article for automobiles according to the present invention can solve the above-described problems according to the following construction.

An interior molded article for automobiles comprises a hard core portion and a soft coating portion for covering the hard core portion, wherein the soft coating portion comprises one or more layers and at least one of them comprises a thermoplastic elastomer material.

BRIEF DESCRIPTION OF THE DRAWING

FIG. 1A is a partial sectional view of a ring portion of a steering wheel which is one example of a molded article which is applied to the present invention.

[Explanation of numbers]

1 Steering wheel
2 Core metal (i.e., Hard core portion)
4 Core metal coating portion (i.e., Soft coating portion)
6 Skin layer
6a External surface of molded article
6b Hard core portion contacting surface
8 Padding layer FIG. 1B is a partial sectional perspective view of a ring portion of a steering wheel which is one example of a molded article which is applied to the present invention.

[Explanation of numbers]

10 Steering wheel
12 Core metal (i.e., Hard core portion)
14 Core metal coating portion (i.e., Soft coating portion)

EMBODIMENTS OF THE INVENTION

One embodiment of the present invention will be set forth below.

An interior molded article for automobiles comprising a hard core portion and a soft coating portion for covering the hard core portion, wherein, preferably, the soft coating portion comprises skin layers forming the external surface of the molded article and the hard core contacting surface, and a padding layer covered with the skin layers, the skin layer is formed with a first thermoplastic elastomer having an abrasion resistance (hereinafter abbreviated as "first TPE"), and the padding layer is formed with a second thermoplastic elastomer (hereinafter abbreviated as "second TPE") which is softer than the first TPE; and the first TPE is a thermoplastic polyurethane elastomer (hereinafter abbreviated as "TPU") or a TPU-based TPU type polymer alloy.

The embodiment of the present invention will be explained by way of an example of a steering wheel (interior molded article for automobiles) as shown in FIG. 1A. The formulation unit is by weight unless otherwise specified.

(1) The steering wheel 1 of the present invention comprises a core metal (hard core portion) 2 and a core metal coating portion (soft coating portion) 4 for covering the core metal 2.

(2) In the above-described construction, the soft coating portion 4 comprises skin layers 6 forming an external surface of a molded article 6a and a contacting portion with the hard core portion 6b, and a padding layer 8 covered with the skin layers 6.

(3) The skin layer 6 is formed with a first TPE having abrasion resistance, and the padding layer 8 is formed with a second TPE which is softer than the first TPE, respectively.

More specifically, for the first TPE, one having a hardness Hs (JIS K-6301 A) of 70° to 100°, preferably Hs (JIS K-6301 A) of 75° to 95°is used; and for the second TPE, one having a hardness Hs (JIS K-6301 A) of 10° to 60°, preferably Hs (JIS K-6301) of 25° to 50°is used, respectively. If the first TPE is too hard, it is difficult to obtain a molded article having a soft feeling in gripping. To the contrary, if it is too soft, problems are likely to occur on the surface of the molded article such as scratching or stickiness. While, if the second TPE is too hard, it is difficult to obtain a molded article having a soft feeling in gripping as well. To the contrary, if it is too soft, the difference in the physical properties occurs between the skin layer 6 and the padding layer 8 so that an integrated feeling is hardly obtained.

Here, the first TPE is TPU or a TPU-based TPU type polymer alloy.

The isocyanate component of the above-described TPU may be aromatic compounds such as diphenyl methane diisocyanate (MDI) and tolylene diisocyanate (TDI). However, from the aspect of light resistance, aliphatic compounds such as hexamethylene diisocyanate (HMDI), isophorone diisocyanate, hydrogenated TDI and xylene-$\alpha$, $\alpha'$-diisocyanate (XDI) are preferable. Particularly, HMDI is preferable.

The polyol component of TPU may be polyesters or polyethers. Examples of the polyesters include of ethylene adipate, butylene adipate, ethylene butylene adipate, caprolactone and polycarbonates. Examples of polyethers include polytetramethylene glycol.

The above-described TPU polymer alloy preferably comprises, as essential ingredients, at least TPU wherein the isocyanate component is an aliphatic compound, and an acrylate.styrene.acrylonitrile tercopolymer (ASA).

The blending ratio of TPU to ASA is 20/80 to 95/5, preferably 40/60 to 90/10, and more preferably 50/50 to 80/20. When the amount of ASA is too small, a soft feeling in gripping is difficult to obtain. On the contrary, when it is too large, stickiness is felt and abrasion resistance can hardly be obtained.

The above-described ASA basically comprises acrylate (a), styrene (b) and acrylonitrile (c) in the following ratio; generally, (a)/(b)/(c)=50/25/25 to 90/5/5, preferably 60/20/20 to 80/10/10. Further, the ASA should be one which provides a molded article having a hardness (JIS K-6301, A) of 40° to 80°, preferably 50° to 70°.

As the acrylate (acrylic acid ester), butyl acrylate is essential. However, about 40% or less of butyl acrylate may be substituted with 2-ethylhexyl acrylate. Further, methyl-.ethyl (meth)acrylate can be included in an amount of 40% or less, preferably 10 to 30% to the entire acrylate component.

The above-described ASA is synthesized according to radical polymerization using a conventional emulsion polymerization system. The synthesis method can be effected according to the following method described in U.S. Pat. No. 5,380,785.

"The synthesis method comprises (I) a process for synthesizing a nuclear polymer comprising latex by an emulsion polymerization of a mixture of (i) butyl acrylate (substitutable with 2-ethylhexyl acrylate in an amount of 40 mol % or less), (ii) at least one acrylate selected from methyl or ethyl (meth)acrylate, (iii) acrylonitrile, (iv) a crosslinking agent (polyfunctional acrylate) and (v) a maleate higher aliphatic acid monoester; (II) a process for synthesizing a rubber polymer-containing emulsion by adding (i) styrene, (ii) residue acrylonitrile and (iii) a residue crosslinking agent to the resulting nuclear polymer; and (III) a process for recovering the rubber polymer from the resulting emulsion."

The above-described second TPE is not particularly limited as long as it is softer than the first TPE. Namely, TPU which is the same kind of and softer than TPU used in the first TPE can be used. Further, thermoplastic polyolefin elastomer (TPO), thermoplastic polystyrene elastomer (TPS), thermoplastic polyamide elastomer and thermoplastic polyester elastomer can be optionally used. Particularly, TPO and TPS can be controlled in the hardness by the addition of, for example, a processing oil and, therefore, the resulting product is preferably to have a desired low hardness and good flexibility.

Particularly, the second TPE which has a hardness Hs [JIS X-6301 A] of 60° or less, and comprises, as essential ingredients, a thermoplastic polyurethane elastomer (TPU) and a thermoplastic polystyrene elastomer (TPS) or a thermoplastic polyolefin elastomer (TPO) wherein the composition ratio by weight thereof is the former(TPU)/the latter (TPE=TPS or TPO)=10/90 to 50/50 is preferable.

Particularly, polymer alloy having a hardness Hs (JIS AK-6301) of 60° or less, and comprising, as essential ingredients, TPU and TPE (TPS or TPO) is preferably used as the second TPE. The composition ratio of TPE/TPU is 10/80 to 50/50, more preferably 15/85 to 40/60.

While, from the aspect of lightening, it can be considered to use a polymer alloy comprising TPO, TPS and TPU, which have a polar group introduced thereto. Examples of the above-described polar group include a carboxyl group, hydroxyl group and epoxy group.

TPO herein means TPE comprising, as the hard phase, a crystalline polyolefin such as polypropylene (PP) and polyethylene (PE). The soft phase is generally ethylene-$\alpha$-olefin type rubber. However, those using below-described TPS and SBR such as SEPS and SEBS can be included. Further, those comprising a partially crosslinked or completely crosslinked rubber component which is to be a soft phase can be included. Examples of the above-described $\alpha$-olefin include propylene, 1-butene, 1-hexene and 1-decene.

Examples of the above-described TPS include SBS (PS-polybutadiene-PS triblock copolymer or the compound mainly comprising the same) of SIS (PS-polyisoprene-PS triblock copolymer or the compound mainly comprising the same), and hydrogenated products thereof, i.e., SEBS (PS-polyethylene/polybutylene-PS), SEPS (PS-polyethylene/polypropylene-PS) and hydrogenated SBR (hydrogenated styrene butadiene rubber).

(4) Preparation of molding material and molded article:
(i) Preparation of molding material The first TPE forming a skin layer and the second TPE forming a padding layer can be added with a processing oil and other polymers depending upon the necessity for the purpose of imparting injection molding property and controlling hardness. Further, the above-described each base polymer can be optionally added with secondary materials such as a lubricant, a softening agent, an inorganic filler, a colorant, a heat stabilizer, an antioxidant, an ultraviolet absorber and an anti-aging agent, then the resultant mixture is kneaded by means of a double-screw extruder, successively the kneaded product is pelletized to form each injection molding material for forming the skin layer and the padding layer.

(ii) Preparation of molded article

In the case of a steering wheel, it is produced by, for example, a known two-color injection molding, so-called a sandwich molding.

A core metal 1 is arranged in the center of the cavity of a wheel in a mold, then first TPE material is charged into the mold through a sprue runner gate. Successively, the second TPE material is charged through the same sprue runner gate as that in the first TPE material (provided that injection cylinder is different) to form a padding layer 8 (refer to FIG. 1A). Then, after cooling and curing, a molded article is released.

Thus, is formed skin layers 6 comprising the external surface of the molded article 6a and the hard core contacting surface 6b. The thickness of the skin layer is 0.1 to 3 mm, preferably 0.5 to 1.3 mm and more preferably around 1 mm. If it is too thin, desirable abrasion resistance and mechanical strength are difficult to be obtained. While, if it is too thick, a soft feeling in gripping can hardly be obtained.

The molded article thus obtained can be used as it is (without coating), alternatively it can be used after being coated depending upon the requirements for obtaining higher abrasion resistance and desirable design characteristics.

Further, another embodiment of the present invention will be set forth below.

An interior molded article for automobiles comprising a hard core portion and a soft coating portion for covering the hard core portion wherein, preferably, a base polymer of the thermoplastic elastomer (TPE) material in the soft coating portion comprises, as a first component, acrylate styrene acrylonitrile triblock copolymer (ASA) and, as a second component, an amorphous polar group-containing resin comprising, as a monomer or a comonomer, a polar group-substituted ethylene.

The embodiment of the present invention will be explained by way of the example of a steering wheel (interior molded article for automobiles) shown in FIG. 1B. The formulation unit is by weight unless otherwise specified.

(1) The steering wheel 10 of the present invention comprises a core metal (hard core portion) 12 and a core metal coating portion (soft coating portion) 14 for covering the core metal 12.

(2) In the embodiment of the present invention, a base polymer of the TPE material forming the soft coating portion 14 comprises, as a first component, ASA and, as a second component, an amorphous resin having a polar group introduced therein wherein a polar group substituted ethylene is a monomer or a comonomer. In the present embodiment, although the soft coating portion has a monolayer structure, only the skin side may have double layer structure formed with the above-described TPE material or a sandwich structure.

(3) The thickness of the soft coating portion is, in general, 1 to 10 mm, preferably 5 to 10 mm.

The addition of the second component to the first component improves the abrasion resistance and substantially eliminate the sticky feeling. Although the reason cannot be firmly determined, it can be estimated that the reason is based on the fact that since a polar group is introduced in the second component, compatibility with ASA is desirable. The first component ASA basically comprises acrylate (a), styrene (b) and acrylonitrile (c) in the following ratio; generally, (a)/(b)/(c)=50/25/25 to 90/5/5, preferably 60/20/20 to 80/10/10. Further, the ASA should be one which provides a molded article having a hardness (JIS K-6301, A) of 40 to 80, preferably 50 to 70.

As the acrylate (acrylic acid ester) herein, butyl acrylate is essential. However, butyl acrylate wherein about 40% or less thereof is substituted with 2-ethylhexyl acrylate can be used. Further, it is preferable that 40% or less, preferably 10 to 30% of methyl.ethyl (meth)acrylate based on the entire acrylate components is included therein.

The above-described ASA is synthesized according to radical polymerization using a conventional emulsion polymerization system. The synthesis method can be effected by the following method described in U.S. Pat. No. 5,380,785. "The synthesis method comprises (I) a process for synthesizing a nuclear polymer comprising latex by an emulsion polymerization of a mixture of (i) butyl acrylate (substitutable with 2-ethylhexyl acrylate in an amount of 40 mol % or less), (ii) at least one acrylate selected from methyl or ethyl (meth)acrylate, (iii) acrylonitrile, (iv) a crosslinking agent (polyfunctional acrylate) and (v) a maleate higher aliphatic acid monoester; (II) a process for synthesizing a rubber polymer-containing emulsion by adding (i) styrene, (ii) residue acrylonitrile and (iii) a residue crosslinking agent to the resulting nuclear polymer; and (III) a process for recovering the rubber polymer from the resulting emulsion."

As the above-describe second component, i.e., amorphous polar group-containing resin, PMMA, AS, AES, AAS (acrylate.acrylonitrile.styrene copolymer) can be suitably used. Among these, one or two or more resins can be selected for use.

As the above-described PMMA, currently used commercially available products can be used. Specifically examples include products for injection molding grade such as "Acrypet" (manufactured by Mitsubishi Rayon Company Limited) and "Parapet" (manufactured by Kuraray Co., Ltd.).

As AS, currently used commercially available products can be used. Specifically examples include "Estyrene AS" (manufactured by Nippon Steel Chemical Co., Ltd.) and "Toyolac G" (manufactured by Toray Industries, Inc.).

As AES, currently used commercially available products can be used. Specifically examples include "JSR AES" (manufactured by Japan Synthetic Rubber Co., Ltd.) and "Toyolac AES" (manufactured by Toray Industries, Inc.).

As AAS, currently used commercially available products can be used. Specifically examples include "Luran" (manufactured by BASF Co., Ltd.) and "Vitax" (manufactured by Hitachi Chemical Co., Ltd.).

The formulation ratio of the above-described components are as follows.

The formulation ratio of the above-described first and second components (ASA/amorphous polar group-containing resin) varies depending upon the hardness required for the molded article for automobiles. Generally, in order to obtain a soft feeling, a surface hardness is set to have a value of from more than 50° to less than 100°, desirably from 70° to 95° in terms of the spring type hardness Hs (JIS K-6301 A). That is, the hardness of ASA alone is about 50°, and, therefore, a molded article having a hardness of not more than such the value is difficult to be obtained. Contrary to this, a molded article having a hardness of 100° cannot provide a soft feeling. The formulation ratio for obtaining a molded article having a hardness of the above-described range is generally the first component/the second component=99/1 to 73/27, preferably 97/3 to 78/22.

Further, the base polymer comprising the above-described first component (ASA) and the second component (amorphous polar group-containing resin) can be optionally added with secondary materials such as a lubricant, a softening agent (plasticizer), an inorganic filler, a colorant, a heat stabilizer, an antioxidant, an ultraviolet absorber and an anti-aging agent, followed by mixing, thereafter TPE material for injection molding or extrusion molding is prepared.

To the base polymer, currently used olefin type-, urethane type-, ester type- and styrene type-TPE can be added, as a third component, in an amount which does not impair the object of the present invention.

The above-described kneading is effected in an unopen type apparatus such as a Banbury mixer, kneader and single- or double-screw extruder.

(i) As the above-described lubricant/softening agent, the following substances can be exemplified.

Silicone oil such as dimethyl silicone and methylphenyl silicone; petroleum substances such as processing oil, lubricating oil, paraffin, liquid paraffin, petroleum asphalt and Vaseline;

coal tars such as coal tar and coal tar pitch;

fatty oils such as castor oil, linseed oil, rapeseed oil, soybean oil and palm oil;

waxes such as tall oil, beeswax, carnauba wax and lanolin;

fatty acids such as ricinoleic acid, palmitic acid and stearic acid, or the metal salts thereof;

synthetic polymers such as petroleum resins, chromanindene resins and atactic polypropylene;

ester type plasticizers such as dioctyl phthalate, dioctyl adipate and dioctyl sebacate;

microcrystalline wax, liquid polybutadiene or the modified products or hydrogenated products thereof, liquid Thiokol.

(ii) Examples of the above-described inorganic filler include calcium carbonate, calcium silicate, clay, kaolin, talc, silica, diatomaceous earth, mica powder, asbestos, barium sulfate, aluminum sulfate, calcium sulfate, magnesium carbonate, molybdenum disulfide, glass fiber, glass sphere, shirasu balloon, graphite and alumina.

Preparation of molded articles

A steering wheel is produced according to a well-known injection molding method.

For example, a steering wheel having a skin material wherein a grain pattern is formed on the surface can be produced by arranging a wheel core metal in a mold having a grain pattern on the surface thereof, then injecting the above-described molding material into the mold, followed by cooling so that the molding material may be solidified

EFFECT OF THE INVENTION

The interior molded article for automobiles according to the present invention has such a construction that the soft coating portion is made of a thermoplastic elastomer material as mentioned above Thus, the following effects can be produced The interior molded article for automobiles according to the present invention can provide a soft feeling in gripping without using RIM urethane comparable to that of an integral skin comprising RIM urethane Further, the interior molded article for automobiles according to the present invention can be re-used by optionally selecting a thermoplastic elastomer material so that it can contribute not only to saving resources and energy, but also to the improvement of deterioration in the environment.

Thus, the interior molded article for automobiles according to the present invention can provide a soft feeling with substantially no stickiness and excellent abrasion resistance, which will be shown in the Examples below. The TPE material used in a molded article according to the present invention can contribute not only to saving resources and energy, but also to the improvement of deterioration in the environment.

EXAMPLES

In order to confirm the effects of the present invention, Examples, Comparative Examples and Reference Example are provided below Examples I-1 to I-7 and Comparative Examples I-1 to I-6

(1) The detail of each component used in the first TPE and the second TPE in the Examples I-1 to I-7 and Comparative Examples I-1 to I-6 are as follows;

(a) ASA
  acrylate content: 70%
  styrene content: 15%
  acrylonitrile content: 15%
  hardness Hs (JIS K-6301 A): 65
(b) TUP-1 (HMDI type TUP)
  isocyanate component: hexamethylene diisocyanate
  polyol component: adipate type
  hardness Hs (JIS K-6301 A): 95
(c) TUP-2 (MDI type TPU)
  isocyanate component: 4,4'-dimethyl diisocyanate
  polyol component adipate type
  hardness Hs (JIS K-6301 A): 85
(d) TPO-1
  PP/EPDM/processing oil=30/50/20
  hardness Hs (JIS K-6301 A): 40
(e) TPO-2
  PP/SEPS/processing oil=20/50/30
  hardness Hs (JIS K-6301 A): 15
(f) TPO-3
  PP/EPDM/processing oil=50/40/10
  hardness Hs (JIS K-6301 A): 75
(g) TPO-4
  PP/SEBS/processing oil=50/40/10
  hardness Hs (JIS K-6301 A): 70
(h) Acid-modified TPO
  The product obtained by graft-polymerizing maleic anhydride with the above-described TPO-1
  (graft rate: 1 wt %)
  hardness Hs (JIS K-6301 A): 40
(i) TPEP
  hard phases polybutylene terephthalate
  soft phase: polyether polyol
  hardness Hs (JIS K-6301 A): 75
(j) RIM urethane
  isocyanate component hexamethylene diisocyanate
  polyol component adipate type
  hardness Hs (JIS K-6301 A): 68

(2) The TPE or the TPE composition having the formulation shown in Tables I-1 and I-2 was fully stirred and mixed in a Henschel mixer, then the resulting mixture was kneaded through a double-screw extruder set at 220° C. having a screw diameter of 30 mm, successively molding materials (pellet) used each Example and Comparative Example were prepared.

(3) In each Example, various combinations of a skin layer with a padding layer shown in Table I-1 were employed and a wheel coating portion of a steering wheel was sandwich-molded. While, in each Comparative Example, a wheel coating portion was mono-layer injection molded with a molding material shown in Table 2. The products of Examples I-1 to I-7, Comparative Examples I-1 to I-6 and Reference Example thus prepared were examined regarding the following items.

The molding conditions are as follows;
Molding conditions
cylinder temperature: 220° C., mold temperature: 40° C. and injection pressure: 38 MPa 1) Organoleptic evaluation of stickiness (ordinary temperature)

The feeling obtained when a test piece (40 mm×110 mm×2 mm) was traced by a finger was evaluated by several testers (people who effect an organoleptic evaluation). The evaluation was effected at 20° C. (ordinary temperature) and 30° C. and the testers were discussed to determine the evaluation results. Evaluation criteria are as follows;

5 no sticky feeling (acceptable)

4 slightly sticky feeling (acceptable)

3 some sticky feeling (unacceptable)

2 clearly sticky feeling (unacceptable)

1 noticeably sticky feeling (unacceptable)

2) abrasion test

Abrasion test was effected by means of a Ford abrasion testing machine and the difference in the thickness of the test piece before or after the test was determined.

Contactor: cotton sail cloth, reciprocating cycle: 60 times/min., stroke: 40 mm

3) Hardness
Determined according to JIS K 6301 A

4) Soft feeling in gripping

By using a core metal (diameter 12.7 mm), a skin layer (thickness: 1 mm) and a padding layer were sandwich-molded, whereby a wheel portion of a steering wheel was formed. As the skin layer, each indicated TPE material was used, while, as the padding layer, a TPE material was used as well. Then, a soft feeling in gripping was evaluated by several testers by actually gripping the wheel portion with hands. The evaluation criteria are as follows;

3 soft feeling (acceptable)

2 some soft feeling (acceptable)

1 hard feeling (unacceptable)

5) Feeling in gripping steering wheel

By using the same steering wheel as that used in the above-described "soft feeling in gripping", a feeling of familiarity with each steering wheel in gripping was evaluated by several testers by actually gripping the wheel portion with hands. The evaluation criteria are as follows;

G no unfitting feeling (acceptable)

M some unfitting feeling (acceptable)

B unfitting feeling (unacceptable)

The results of the above-described tests are shown in Tables I-1 and I-2. In the Examples satisfying the requirements of the present invention (cases where a skin layer is TPU type), resistance to sticky feeling and abrasion resistance of the wheels are desirable and further, a soft feeling and a feeling of fitting with a steering wheel in gripping are also excellent. Thus, it can be seen that the steering wheels according to the present invention are sufficiently practical. While, in Comparative Examples, it can be seen that steering wheels are desirable in a soft feeling and a feeling of fitting with a steering wheel in gripping, but they have problems in resistance to sticky feeling and abrasion resistance.

TABLE I-1

(): Hardness (JIS K-6301 A)

|  | Ex. I-1 | Ex. I-2 | Ex. I-3 | Ex. I-4 | Ex. I-5 | Ex. I-6 | Ex. I-7 |
|---|---|---|---|---|---|---|---|
| Construction of product | | | | | | | |
| Skin layer | TPU-1 = 100 (95) | TPU-1/ASA = 80/20 (86) | TPU-1/ASA = 60/40 (80) | ← | ← | ← | TPU-2/ASA = 60/40 (76) |
| Padding layer | *1 70/30 (32) | ← | ← | *2 80/20 (48) | acid-modified TPO = 100 (40) | TPO-2 = 100 (15) | *3 70/30 (35) |
| Evaluation results | | | | | | | |
| Organoleptic evaluation of stickiness (ordinary temperature) | 5 | 4 | 4 | 4 | 4 | 4 | 5 |
| Abrasion (μm) | 0.5 | 0.8 | 1.3 | 1.3 | 1.3 | 1.3 | 0.6 |
| Soft feeling in gripping | 2 | 3 | 3 | 2 | 3 | 3 | 3 |
| Feeling in gripping | G | G | G | G | G | M | G |

*1) TPO-2/TPU-1
*2) TPO-1/TPU-1
*3) TPO-2/TPU-2

TABLE I-2

|  | Comp. Ex. I-1 | Comp. Ex. I-2 | Comp. Ex. I-3 | Comp. Ex. I-4 | Comp. Ex. I-5 | Comp. Ex. I-6 | Ref. Example |
|---|---|---|---|---|---|---|---|
| Construction of product | ASA | TPU-1/ASA = 60/40 | TPO-1 | TPO-3 | TPO-4 | TPEE | RIM urethane |
| Hardness (JIS K-6301 A) | 65 | 80 | 40 | 75 | 70 | 75 | 68 |
| Organoleptic evaluation of stickiness (ordinary temperature) | * | 4 | 1 | 2 | 3 | 3 | 5 |
| Abrasion ($\mu$m) | * | 1.3 | 15 | 13 | 10 | 7 | 0.1 |
| Soft feeling in gripping | * | 1 | 3 | 2 | 2 | 2 | 3 |
| Feeling in gripping | * | G | G | G | G | G | G |

* molding of handle is impossible (injection molding impossible)

Examples II-1 to II-6 and Comparative Examples II-1 to II-5

The specifications of each component of base polymers used in Examples and Comparative Examples are shown below.

(i) ASA
   acrylate content: 70%
   styrene content: 15%
   acrylonitrile content: 15%
   hardness Hs (JIS K-6301 A): 53
   MFR: 2.5 g/10 min.
   Mooney viscosity ($ML_{1+4}$ 100° C.): 44

(ii) PMMA
   "Acrypet MF" (manufactured by Mitsubishi Rayon Company Limited)

(iii) AAS
   "Luran S" (manufactured by BASF Co., Ltd.)

(iv) AES
   "JSR-AES 112K" (Japan Synthetic Rubber Co., Ltd.)

(v) TPO
   Hardness Hs (JIS K-6301 A): 80°
   MFR: 10 g/10 min.

(vi) TUP (MDI type)
   Isocyanate component diphenylmethane diisocyanate
   Polyol component: adipate type
   Hardness Hs (JIS K-6301 A): 87°

The mixtures having the formulations shown in Tables II-1 and II-2 (solely polymer components) were fully stirred and mixed in a Henschel mixers then the resulting mixtures were kneaded through a double-screw extruder set at 220° C. having a screw diameter of 30 mm, successively molding materials (pellets) used in each Example and Comparative Example were prepared.

The molding materials of each Example and Comparative Example thus prepared were examined regarding the following items.

The molding conditions are as follows;
Molding conditions
   cylinder temperatures 220° C., mold temperatures 40° C. and injection pressure: 38 MPa 1) Molding appearance evaluation (ordinary temperature)
   The appearance of a test piece (40 mm×110 mm×2 mm) was visually evaluated by several testers Evaluation criteria are as follows;
   G desirable molding appearance (acceptable)
   B poor molding appearance (unacceptable)

2) Ford abrasion test
   Abrasion test was effected by means of a Ford abrasion testing machine under the below-described conditions and the difference in the thickness of the test piece before or after the test was determined.
   Test piece: Injection molding sheet having grain pattern of the depth of 100 $\mu$m.
   Load: 200 g, Contactor: cotton sail cloth (normal grade: No. 10), reciprocating cycle: 60 times/min., 3) Organoleptic evaluation of stickiness (ordinary temperature)
   A touch feeling obtained when a test piece (40 mm×110 mm×2 mm) was traced by a finger was evaluated by several testers. The evaluation was effected at 20° C. (ordinary temperature) and 30° C. and the testers were discussed to determine the evaluation results. Evaluation criteria are as follows;
   5 no sticky feeling (acceptable)
   4 slightly sticky feeling (acceptable)
   3 some sticky feeling (unacceptable)
   2 clearly sticky feeling (unacceptable)
   1 noticeably sticky feeling (unacceptable)

3) Quantitative evaluation of stickiness (peeling strength)
   The above-described test pieces are piled to produce a sheet having a size of 75 mm×150 mm×2 mm by means of press molding.
   Saran wrap (manufactured by Asahi Chemical Industry Co., Ltd.) was adhered thereto under pressure at 30 kgf/cm$^2$ (2.9 MPa) by cold pressing for 1 minute.
   A tape was adhered to this wrap and peeling strength was determined, whereby stickiness (adherence) was evaluated.

4) Hardness
   Sring type hardness test (A type) was effected according to JIS K 6301, A.

The above-described test results are shown in Tables II-1 and II-2. It can be seen that injection molding articles of Examples satisfying the requirements of the present invention not only have a desirable molding ability and abrasion resistance satisfying the value desired to be achieved (5 $\mu$m or less), but also have substantially no stickiness. Thus, it can be seen that they have almost the same surface physical properties as those of TPU. Further, they have a surface hardness of Hs (JIS K 6301, A) of 95 or less. Namely, the surface hardness is in soft region having the Hs (JIS K 6301, A) of less than 100, and therefore, it can be seen that they have a soft feeling.

While, Comparative Example II-1 wherein the base polymer solely comprises ASA has poor abrasion resistance and has stickiness. In, Comparative Example II-5 wherein TPO is added to ASA, although sticky feeling is substantially eliminated, abrasion resistance is poor.

TABLE II-1

|  | Comp. Ex. II-1 | Ex. II-1 | Ex. II-2 | Comp. Ex. II-2 | Ex. II-3 | Ex. II-4 | Comp. Ex. II-3 |
|---|---|---|---|---|---|---|---|
| (A) ASA elastomer | 100 | 95 | 80 | 70 | 95 | 80 | 70 |
| (B-1) PMMA | 0 | 5 | 20 | 30 | — | — | — |
| (B-2) AAS | — | — | — | — | 5 | 20 | 30 |
| (B-3) AES | — | — | — | — | — | — | — |
| Molding appearance | B | G | G | G | G | G | G |
| Abrasion resistance (Ford abrasion mm) | 6 | 4 | 0.8 | 0.5 | 4 | 0.2 | 0.1 |
| Sticky feeling (organoleptic evaluation) | 3 | 4 | 5 | 5 | 4 | 5 | 4 |
| Peeling strength | 8 | 2 | 0.8 | 0.2 | 3 | 0.3 | 0.1 |
| Hardness Hs (JIS K-6301 A) | 65 | 72 | 94 | 100 | 72 | 94 | 100 |

TABLE II-2

|  | Ex. II-5 | Ex. II-6 | Comp. Ex. II-4 | Ex. II-7 | Comp. Ex. II-5 | Ref. Ex. |
|---|---|---|---|---|---|---|
| (A) ASA elastomer | 95 | 80 | 70 | 80 | 80 | — |
| (B-1) PMMA | — | — | — | 10 | — | — |
| (B-2) AAS | — | — | — | 10 | — | — |
| (B-3) AES | 5 | 20 | 30 | — | — | — |
| (B-4) TPO | — | — | — | — | 20 | — |
| (B-5) TPU | — | — | — | — | — | 100 |
| Molding appearance | G | G | G | G | G | G |
| Abrasion resistance (Ford abrasion mm) | 4 | 0.4 | 0.2 | 4 | 10 | 0.3 |
| Sticky feeling (organoleptic evaluation) | 4 | 5 | 5 | 4 | 4 | 5 |
| Peeling strength | 3 | 0.4 | 0.2 | 3 | 2 | 0.1 |
| Hardness Hs (JIS K6301, A) | 71 | 92 | 100 | 72 | 77 | 87 |

While the invention has been described in detail and with reference to specific embodiments thereof, it will be apparent to one skilled in the art that various changes and modifications can be made therein without departing from the spirit and scope thereof.

What is claimed is:

1. An interior molded article for automobiles comprising:
   a hard core portion; and
   a soft coating portion for covering the hard core portion, wherein said soft coating portion comprises one or more layers and at least one of them comprises a thermoplastic elastomer material, wherein the hard core portion is harder than the soft coating portion, and wherein the hardness of the soft coating portion is in the range of 10° to 100° as per JIS K-6301 A.

2. The interior molded article for automobiles as claimed in claim 1, wherein said soft coating portion comprises a first skin layer forming the external surface of the molded article and a second skin layer overlying said hard core portion forming a hard core contacting surface, and a padding layer formed between said first and second skin layers, wherein said skin layers are formed with a first thermoplastic elastomer having an abrasion resistance (first TPE), and said padding layer is formed with a second thermoplastic elastomer (second TPE) which is softer than said first thermoplastic elastomer, and said first thermoplastic elastomer is a thermoplastic polyurethane elastomer (TPU) or a polymer alloy comprising, as a base, the thermoplastic polyurethane elastomer.

3. The interior molded article for automobiles as claimed in claim 2, wherein said polymer alloy comprises, as essential ingredients, TPU and an acrylate.styrene.acrylonitrile terpolymer (ASA), and the ratio of TPU to ASA by weight thereof is from 20/80 to 95/5.

4. The interior molded article for automobiles as claimed in claim 3, wherein said acrylate.styrene.acrylonitrile terpolymer (ASA) has a ratio of acrylate/styrene/acrylonitrile of 50/25/25 to 90/5/5 and a hardness Hs of 40 to 80°.

5. The interior molded article for automobiles as claimed in claim 2, wherein said second thermoplastic elastomer has a hardness Hs according to JIS K-6301 A of 10° to 60°, and comprises, as essential ingredients, a thermoplastic polyurethane elastomer (TPU) and a thermoplastic polystyrene elastomer (TPS) or a thermoplastic polyolefin elastomer (TPO), and the ratio of TPS to TPO by weight thereof is from 10/90 to 50/50.

6. The interior molded article for automobiles as claimed in claim 5, wherein said second thermoplastic elastomer is a polymer alloy having a hardness Hs of 60° or less, and comprising, as essential ingredients, TPE and TPU wherein the composition ratio by weight of TPE/TPU is 80/20 to 70/30.

7. The interior molded article for automobiles as claimed in claim 2, wherein in said TPU, the isocyanate component is an aliphatic compound.

8. The interior molded article for automobiles as claimed in claim 2, wherein said first thermoplastic elastomer and said second thermoplastic elastomer are materials which can be thermally fusion-bonded with each other.

9. The interior molded article for automobiles as claimed in claim 2, wherein said skin layer has a thickness of 0.1 to 3 mm.

10. The interior molded article for automobiles as claimed in claim 2, wherein the hardness Hs of said first thermoplastic elastomer is 70° to 100° as per JIS K-6301 A.

11. The interior molded article for automobiles as claimed in claim 2, wherein the hardness Hs of said first thermoplastic elastomer is 75° to 95° as per JIS K-6301 A.

12. The interior molded article for automobiles as claimed in claim 2, wherein said second thermoplastic elastomer has a hardness Hs according to JIS K-6301A of 25° to 50°, and comprises, as essential ingredients, a thermoplastic polyurethane elastomer (TPU) and a thermoplastic polystyrene elastomer (TPS) or a thermoplastic polyolefin elastomer (TPO), and the ratio of TPS to TPO by weight thereof is from 10/90 to 50/50.

13. The interior molded article for automobiles as claimed in claim 1, wherein a base polymer of the thermoplastic elastomer material in said soft coating portion comprises, as a first component, acrylate styrene acrylonitrile triblock copolymer (ASA) and, as a second component, an amorphous polar group-containing resin comprising, as a monomer or a comonomer, a polar group-substituted ethylene.

14. The interior molded article for automobiles as claimed in claim 13, wherein said amorphous polar group-containing resin comprises one or two or more compounds selected from the group consisting of polymethyl methacrylate (PMMA), an acrylonitrile styrene copolymer (AS), an acrylonitrile ethylene styrene copolymer (AES) and an acrylate acrylonitrile styrene copolymer (AAS).

15. The interior molded article for automobiles as claimed in claim 13, wherein the mixing ratio of the first component/the second component by weight is from 99/1 to 73/27.

16. The interior molded article for automobiles as claimed in claim 13, wherein said ASA has a monomer composition of acrylate/styrene/acrylonitrile of from 50/25/25 to 90/5/5.

17. The interior molded article for automobiles as claimed in claim 13, wherein said soft coating portion has a thickness of 1 to 10 mm.

* * * * *